United States Patent
Nacey et al.

(10) Patent No.: US 10,150,175 B2
(45) Date of Patent: Dec. 11, 2018

(54) GAS SYSTEMS, WELDING SYSTEMS, AND METHODS OF WELDING

(71) Applicant: KUKA Robotics Corporation, Shelby Township, MI (US)

(72) Inventors: Timothy James Nacey, Deerfield, IL (US); Mitchel Dupon, Kitchener (CA); Mike Maximiuk, Washington, MI (US)

(73) Assignee: KUKA Robotics Corporation, Shelby Township, MI (US)

( * ) Notice: Subject to any disclaimer, the term of this patent is extended or adjusted under 35 U.S.C. 154(b) by 496 days.

(21) Appl. No.: 14/793,078

(22) Filed: Jul. 7, 2015

(65) Prior Publication Data

US 2016/0001391 A1    Jan. 7, 2016

Related U.S. Application Data (60) Provisional application No. 62/021,358, filed on Jul. 7, 2014.

(51) Int. Cl.
*B23K 9/32* (2006.01)
*B23K 9/00* (2006.01)
(Continued)

(52) U.S. Cl.
CPC .............. *B23K 9/325* (2013.01); *B23K 9/00* (2013.01); *B23K 9/0953* (2013.01);
(Continued)

(58) Field of Classification Search
CPC ...... B23K 35/38; B23K 25/383; B23K 9/167; B23K 9/325; B23K 9/126; B23K 10/02;
(Continued)

(56) References Cited

U.S. PATENT DOCUMENTS

| 4,029,933 A | 6/1977 | Oishi et al. |
| 4,095,080 A * | 6/1978 | Ueyama ................. B23K 9/164 |
| | | 219/137.41 |

(Continued)

FOREIGN PATENT DOCUMENTS

| CA | 2455644 A1 | 7/2005 |
| DE | 102012009866 A1 | 11/2013 |

(Continued)

OTHER PUBLICATIONS

International Searching Authority, International Preliminary Report on Patentability in International Application No. PCT/US2015/039357 dated Jan. 10, 2017; 9 pages.
(Continued)

*Primary Examiner* — Geoffrey S Evans
(74) *Attorney, Agent, or Firm* — Dorton & Willis, LLP (57) ABSTRACT

A gas delivery system delivers a shielding gas from a source through one or more hoses to a torch having a nozzle during welding of a workpiece. A shielding gas controller includes an inlet, an outlet, and at least one valve between the inlet and the outlet. The valve operates in response to a predetermined minimum shielding gas flow set point. The shielding gas controller operates the valve before or after a weld to change the flow of the shielding gas according to the predetermined minimum shielding gas flow set point. A method of welding includes predetermining a flow rate of a shielding gas, predetermining another flow rate of the gas, dispensing the gas at the first flow rate proximate a first weld pool during welding, and dispensing the shielding gas at the second flow rate, different from the first flow rate, during welding of another weld on the workpiece.

20 Claims, 4 Drawing Sheets

(51) Int. Cl.
*B23K 9/12* (2006.01)
*B23K 31/12* (2006.01)
*B23K 9/095* (2006.01)
*B23K 9/16* (2006.01)
*B23K 9/167* (2006.01)
*B23K 10/00* (2006.01)
*B23K 10/02* (2006.01)

(52) U.S. Cl.
CPC ............ *B23K 9/0956* (2013.01); *B23K 9/126* (2013.01); *B23K 9/164* (2013.01); *B23K 9/167* (2013.01); *B23K 10/00* (2013.01); *B23K 10/02* (2013.01); *B23K 31/125* (2013.01)

(58) Field of Classification Search
CPC .... B23K 10/00; B23K 9/0953; B23K 9/0956; B23K 31/125; B32K 9/164; G05B 2219/45135
See application file for complete search history.

(56) References Cited

U.S. PATENT DOCUMENTS

| | | | | |
|---|---|---|---|---|
| 4,788,409 | A * | 11/1988 | Yamade | B23K 9/167 219/121.45 |
| 6,541,734 | B2 | 4/2003 | Shimogama | |
| 6,610,957 | B2 | 8/2003 | Uttrachi | |
| 7,019,248 | B1 * | 3/2006 | Uttrachi | B23K 35/38 219/74 |
| 7,605,341 | B2 * | 10/2009 | Higgins | B23K 10/00 219/121.51 |
| 8,258,421 | B2 | 9/2012 | Halvorsen et al. | |
| 8,541,710 | B2 | 9/2013 | Brandt et al. | |
| 2007/0056942 | A1 * | 3/2007 | Daniel | B23K 9/1062 219/125.1 |
| 2009/0107960 | A1 | 4/2009 | Hampton | |
| 2010/0011837 | A1 * | 1/2010 | Eglseder | B23K 9/32 73/29.02 |
| 2010/0104736 | A1 | 4/2010 | Luce et al. | |
| 2011/0114615 | A1 * | 5/2011 | Daniel | B23K 9/0953 219/137 R |
| 2011/0127238 | A1 | 6/2011 | Johnson | |
| 2013/0015169 | A1 * | 1/2013 | Marschke | B23K 9/1062 219/130.1 |
| 2013/0068745 | A1 | 3/2013 | Agosti et al. | |
| 2013/0112660 | A1 * | 5/2013 | Enyedy | B23K 9/0956 219/74 |
| 2014/0076862 | A1 * | 3/2014 | Davidson | B23K 9/095 219/121.55 |
| 2014/0091066 | A1 * | 4/2014 | Enyedy | B23K 9/0956 219/74 |
| 2014/0367366 | A1 * | 12/2014 | Bertram | B23K 35/38 219/74 |
| 2015/0154884 | A1 * | 6/2015 | Salsich | G09B 19/24 434/234 |
| 2016/0361774 | A9 * | 12/2016 | Daniel | B23K 9/0953 |

FOREIGN PATENT DOCUMENTS

| | | |
|---|---|---|
| EP | 0993895 A1 | 4/2000 |
| JP | 57-139472 A * | 8/1982 |
| JP | H10272562 A | 10/1998 |
| JP | 2011-189378 A * | 9/2011 |
| WO | WO-02/066195 A2 * | 8/2002 |
| WO | 03082509 A1 | 10/2003 |
| WO | 2008051829 A2 | 5/2008 |

OTHER PUBLICATIONS

International Searching Authority, Search Report and Written Opinion in International Application No. PCT/US2015/039357, dated Dec. 8, 2015.

O'Brien, Annette, "Welding Handbook Processes 9th Edition," "Chapter 4: Gas Metal Arc Welding," American Welding Society, Miami, vol. 2, Part 1, p. 178, dated Jan. 1, 2004.

* cited by examiner

GAS SYSTEMS, WELDING SYSTEMS, AND METHODS OF WELDING

CROSS REFERENCE TO RELATED APPLICATIONS

This application claims priority to U.S. Provisional Patent Application Ser. No. 62/021,358 filed Jul. 7, 2014, the disclosure of which is incorporated by reference herein in its entirety.

TECHNICAL FIELD

The present invention relates generally to gas systems, welding systems and methods of welding, and, more particularly, to automated gas control systems, welding systems, and methods for using them.

BACKGROUND

Welding is the metallurgical joining of separate metallic workpieces. Typically, during welding, two workpieces are brought into proximity to one another. A portion of each workpiece is melted by localized application of heat with a torch connected to an electric welding power supply apparatus to form a pool of molten metal between the workpieces. Heating the workpiece is often accomplished with a welding torch, such as, a Metal Inert Gas (MIG) torch or a Tungsten Inert Gas (TIG) torch. As is known, MIG welding may be referred to as Gas Metal Arc Welding (G MAW) and TIG welding may be referred to as Gas Tungsten Arc Welding (GTAW). Other types of welding may include gas welding, and Flux-Cored Arc Welding (FCAW). In each of these welding processes, a filler material is often added to the pool of molten metal, also known as a weld pool. The filler material may be in the form of a metallic stick or metallic wire.

Once formed, the weld pool is translated or moved along a predetermined path between the two workpieces. The filler material is continuously fed into the weld pool at a controlled rate as the weld pool is translated. The metal in front of the weld pool is melted while the mixture of metal and filler material in the wake of the moving weld pool solidifies as it cools. A weld joint between the two workpieces is formed once the weld pool of molten metal cools.

While welding may be manually performed with a weld torch, it is an automated welding system for large volume manufacturing operations. These systems often include a robot or other electro-mechanically articulated machine to move the welding torch relative to the workpiece. By programming the robot, it may repeatedly trace the torch across the workpiece in a precise, preselected path or along a path that is corrected by external sensors. The filler material in wire form may be fed from a wire spool by an automatic feeder carried on the robot or in close proximity to the robot.

Many of the above-identified welding processes require a shielding gas (e.g., a nonreactive gas, such as, argon). For example, MIG welding requires the use of an inert shielding gas to surround the electrode and the weld pool. The shielding gas displaces normal atmospheric gases from around the molten metal. Shielding gas thus forms a localized gas barrier or buffer between the molten metal and normal atmospheric gases. By providing this barrier, the shielding gas prevents undesirable gases in the atmosphere from reacting with the molten metal. It is known that molten or hot metal may react with atmospheric gases, for example, nitrogen and/or oxygen, and can result in poor quality weld joints. For example, weld joints containing undesirable reaction products, for example, porosity and/or metal oxide inclusions, may exhibit unacceptable properties, such as, poor mechanical strength and poor corrosion resistance. Use of a shielding gas thus generally improves weld quality.

For those welding systems that require a shielding gas, a control system for delivering the gas to the torch may be used. The gas control system may include various regulators and piping to regulate the pressure of the shielding gas and to control its delivery proximate the weld pool. Normally, the delivery is manually controlled with a flow meter, which may be downstream from a pressure gauge coupled to a gas cylinder or bulk gas supply source. Consistent delivery of the minimum required shielding gas is problematic.

Problems with delivery may cause problems with the quality of the weld joint due to variations in the gas barrier. The gas barrier around the weld pool may vary for any number of reasons, for example, simply by virtue of the distance from the supply of shielding gas. Simple procedures may be used to deal with variations in shielding gas flow over the weld pool and the problems associated with insufficient shielding gas.

One common approach is to use an excessive amount of shielding gas by manually setting the flow control to a high level during the entire welding process. Once set, the manual setting is not later adjusted during the welding process. With this approach, even though there may be variation in gas flow, at least the minimal amount of shielding gas will always be present.

In view of problems with existing welding systems, and while welding systems have generally been successful, manufacturers of welding systems and their customers continuously strive to improve their welding systems and welding processes, particularly weld quality and weld quality consistency, while reducing costs.

SUMMARY OF THE INVENTION

The present invention overcomes the foregoing and other shortcomings and drawbacks of welding systems. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a gas delivery system delivers a shielding gas from a source of the shielding gas through one or more pipes or hoses to a welding torch having a nozzle during welding of one or more workpieces. The gas delivery system comprises a shielding gas controller including an inlet for receiving shielding gas from the source of shielding gas through the one or more pipes or hoses, an outlet from which shielding gas flows to the nozzle, and at least one valve between the inlet and the outlet. The valve is operable in response to a predetermined minimum shielding gas flow set point. The shielding gas controller operates the at least one valve at least once before or after a first weld to change the flow of the shielding gas from the nozzle according to the predetermined minimum shielding gas flow set point.

In one embodiment, the valve includes a variable orifice for changing a flow of the shielding gas during welding.

In one embodiment, the shielding gas controller changes the size of the orifice so as to increase or decrease the shielding gas flow rate during an arc start sequence, as compared to the predetermined minimum shielding gas flow set point.

In one embodiment, the at least one valve is a proportional valve.

In one embodiment, each valve is associated with a flow restrictor.

In one embodiment, the shielding gas controller further includes a sensor that is capable of measuring the actual gas flow rate from the outlet and transmitting a signal indicative of the measured flow rate.

In one embodiment, the sensor detects changes in the flow of shielding gas during welding caused by an obstruction in the one or more pipes or hoses upstream and downstream of the sensor.

In one embodiment, a welding process sequence includes a first weld sequence and a second weld sequence different from the first weld sequence in at least one of welding direction, workpiece geometry, or welding speed, and the shielding gas controller changes the shielding gas flow rate between the first weld sequence and the second weld sequence according to the predetermined minimum shielding gas flow set point.

In one embodiment, the shielding gas controller changes the shielding gas flow rate during an arc end sequence, as compared to the predetermined minimum shielding gas flow set point.

In one embodiment, the gas delivery system further includes a sensor in fluid communication with the shielding gas in the one or more pipes or hoses that detects nitrogen and/or other contaminants in the shielding gas.

In one embodiment, the gas delivery system further includes an air supply system in fluid communication with the nozzle for supplying compressed air to the nozzle.

According to one aspect of the present invention, a welding system for welding one or more workpieces comprises the gas delivery system, a welding torch having the nozzle, a welder in electrical communication with the welding torch, a robot that provides relative movement between the welding torch and the one or more workpieces so as to trace the welding torch along a predetermined weld path, a feeder for metering a filler material to the one or more workpieces, and a control system in operable communication with the welder, the shielding gas controller, and the robot, the control system for communicating the predetermined minimum shielding gas flow set point for a first welding sequence including the first weld to the gas delivery system.

In one embodiment, the welding system further includes a weld quality control system in operable communication with the control system and the welder. The weld quality control system detects the quality of the first weld and the quality of one or more subsequent welds and sends a signal to the control system indicative of the respective weld quality. The control system calculates a second predetermined minimum shielding gas flow set point, different from the predetermined minimum shielding gas flow set point and based on the respective weld quality. The control system communicates the second predetermined minimum shielding gas flow set point to the shielding gas controller during welding of the respective weld on a subsequent workpiece.

In one embodiment, the system further includes a sensor in operable communication with the control system and the welder. The sensor detects one or more of voltage and amperage from the welder during welding and sends a signal to the control system indicative of the one or more of the voltage and amperage from the welder. The control system calculates a second predetermined minimum shielding gas flow set point, different from the predetermined minimum shielding gas flow set point and based on the signal indicative of the one or more of the voltage and amperage. The control system communicates the second predetermined minimum shielding gas flow set point to the shielding gas controller during welding of the respective weld on a subsequent workpiece.

In one embodiment, the shielding gas controller increases or decreases the shielding gas flow rate during an arc start sequence, as compared to the predetermined minimum shielding gas flow set point.

In one embodiment, the welding process sequence includes a first weld sequence and a second weld sequence different from the first weld sequence in at least one of welding direction, workpiece geometry, or welding speed, and the shielding gas controller changes the shielding gas flow between the first weld sequence and the second weld sequence according to the predetermined minimum shielding gas flow set point from the control system.

In one embodiment, the welding system further includes a sensor in fluid communication with the shielding gas in the one or more pipes or hoses that detects nitrogen in the shielding gas.

In one embodiment, the welding system further includes an air supply system that is in fluid communication with the nozzle for supplying compressed air to the nozzle.

In one embodiment, during welding, the shielding gas controller outputs a signal to the control system related to the shielding gas flow rate from the outlet.

In one embodiment, the welder includes a weld quality control system in communication with the control system. The weld quality control system is configured to evaluate the quality of the first weld.

In another aspect of the present invention, a method of welding a workpiece comprises (i) predetermining a first flow rate of a shielding gas based on at least one of geometry, weld speed, and welding direction of a first weld on the workpiece; (ii) predetermining a second flow rate of the shielding gas based on at least one of geometry, weld speed, and welding direction of a second weld on the workpiece, the second weld differing from the first weld in at least one of geometry, weld speed, or welding direction; (iii) dispensing the shielding gas at the first flow rate proximate a first weld pool during welding of the first weld on the workpiece; and (iv) dispensing the shielding gas at the second flow rate, different from the first flow rate, proximate a second weld pool during welding of the second weld on the workpiece.

In one embodiment, the first weld and the second weld are consecutive welds on the workpiece.

In one embodiment, the first weld is in a first weld sequence of a plurality of welds and dispensing the shielding gas at the first flow rate includes maintaining the first flow rate for each weld in the first weld sequence.

In one embodiment, the second weld is in a second weld sequence of a plurality of welds and dispensing the shielding gas at the second flow rate includes maintaining the second flow rate for each weld in the second weld sequence.

In one embodiment, the method of welding further includes welding a second workpiece different from the first workpiece. Welding the second workpiece includes dispensing the shielding gas at the first flow rate proximate a third weld pool during welding of a third weld on the second workpiece. The third weld is the same as the first weld in at least one of geometry, weld speed, and welding direction on the second workpiece.

In one embodiment, the method further includes welding a second workpiece different from the first workpiece. Welding includes dispensing the shielding gas at the first flow rate proximate a third weld pool during welding of a third weld on the second workpiece. The third weld is the same as the first weld in geometry, in weld speed, and in welding direction on the second workpiece.

In one embodiment, the method further includes monitoring the quality of the first weld on the workpiece, and changing the first flow rate during welding of the first weld and/or on a second workpiece subsequent to the workpiece based on the quality of the first weld.

BRIEF DESCRIPTION OF THE DRAWINGS

The accompanying drawings, which are incorporated in and constitute a part of this specification, illustrate embodiments of the invention and, together with the detailed description given below, serve to explain the invention.

DETAILED DESCRIPTION

Figure 1:
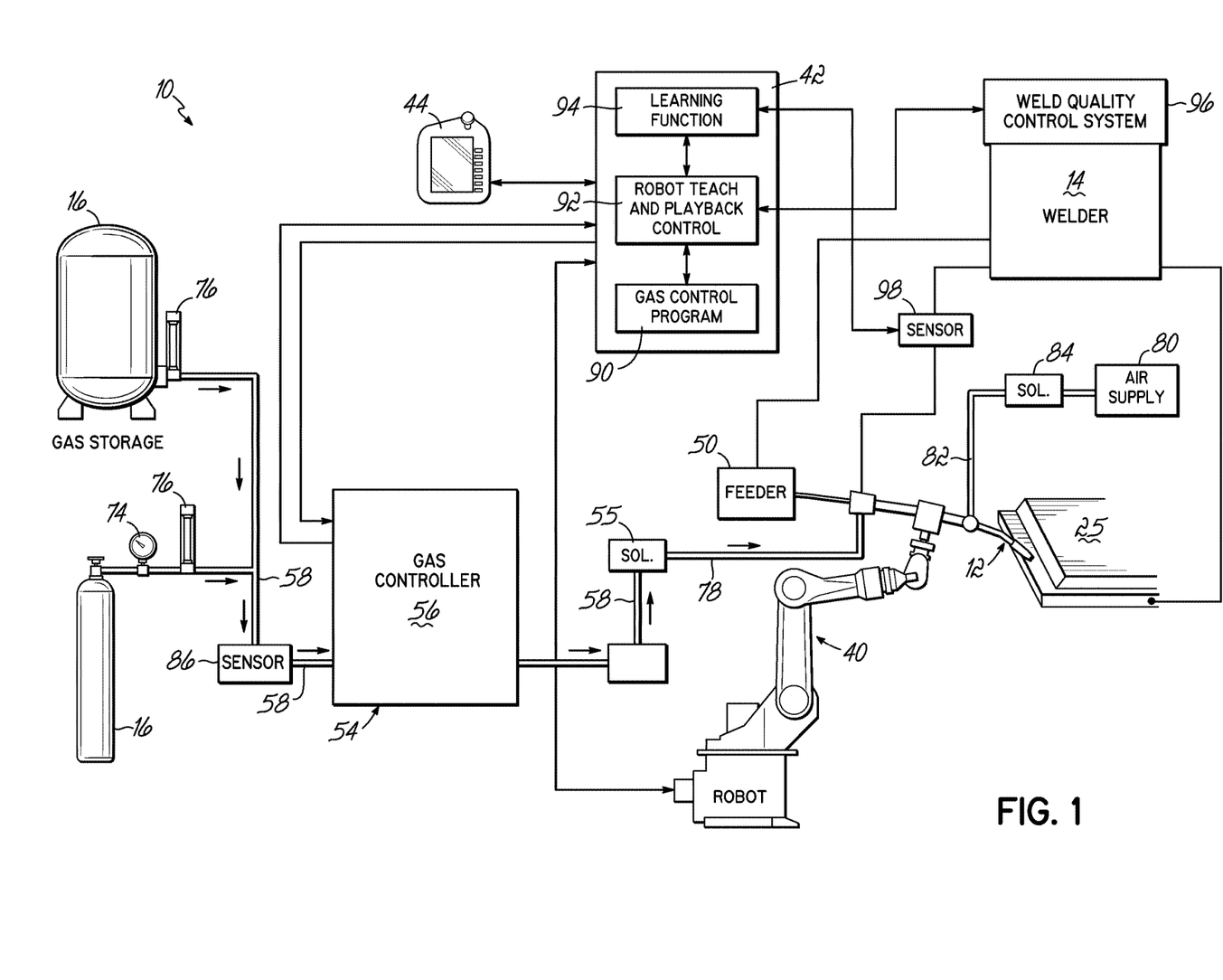
FIG. 1 is a schematic of a welding system according to embodiments of the invention.

With reference to FIG. 1, embodiments of the present invention are generally directed to a welding system 10 for producing consistently high quality weld joints. In this regard, embodiments of the system 10 control a shielding gas flow throughout a welding process, including variation of gas flow during specific portions of that process. While this is described in more detail below, generally, the shielding gas flow is controlled and may be changed prior to and during the start of a welding sequence, from one weld sequence to the next, from one weld to the next, at the end of a weld sequence, during a weld sequence based on external inputs, and/or following the end of a weld sequence. In one embodiment of the invention, the welding system 10 changes the shielding gas flow on a per weld basis, for example, on consecutive weld sequences, and is based on predetermined shielding gas flow settings for that particular weld sequence and/or weld. Advantageously, embodiments of the present invention reduce shielding gas consumption while maintaining or improving weld quality and weld quality consistency.

In addition to controlling shielding gas flow, in one embodiment of the invention, the system 10 may monitor, identify, and/or predict maintenance issues of one or more components of the system 10 before noticeable degradation in weld quality. Thus, the system 10 may include preventive maintenance functions. It will be appreciated that the welding systems as described herein include, but are not limited to, Gas Metal Arc Welding (GMAW), Gas Tungsten Arc Welding (GTAW), plasma arc welding, or plasma cutting systems.

In particular, and with reference to FIG. 1, in one embodiment of the invention, the welding system 10 includes a welding torch 12 electrically coupled to a welder 14 and fluidly coupled to one or more supplies of shielding gas 16, for example, of argon (Ar), carbon dioxide ($CO_2$), helium (He), oxygen ($O_2$) in trace amounts (e.g. about 1% to about 2%), or combinations thereof. By way of example, the exemplary welding torch 12 may be a Metal Inert Gas (MIG) torch, a Tungsten Inert Gas (TIG) torch, or a plasma torch. The supply of shielding gas 16 includes, but is not limited to, a high-pressure cylinder or a bulk gas storage system, as shown.

Figure 2:
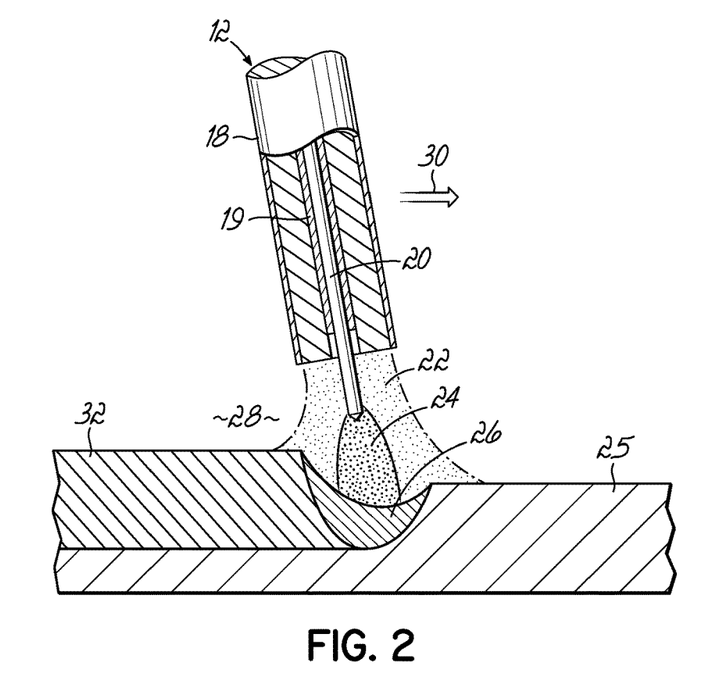
FIG. 2 is a partial cross-sectional view of an exemplary welding torch in use.

According to an exemplary welding process with a MIG torch, and with reference to FIG. 2, the welding torch 12 may include a nozzle 18 surrounding both a contact tube 19 and an electrode 20. Shielding gas may be discharged between the electrode 20 and the nozzle 18 to form a gas barrier 22. The welder 14 (FIG. 1) is electrically coupled to the electrode 20 and provides the electrical power necessary to create an arc 24 between the electrode 20 and a metallic workpiece 25. The arc 24 is sufficient to melt each of the workpiece 25 and the electrode 20 so as to create a weld pool 26 that includes a mixture of the metal of the workpiece 25 and metal from the electrode 20, as the electrode 20 is metered into the weld pool 26. It will be appreciated that metal may be supplied to the weld pool 26 separate from the electrode 20, such as in a TIG or plasma process in which the electrode is not intended to be consumed during the process. In one embodiment, the system 10 includes only a single supply 16 of shielding gas per electrode 20.

The weld pool 26 is separated from atmospheric gases 28 by the gas barrier 22. The welding torch 12 may be moved relative to the workpiece 25 as is indicated by the arrow 30. By this movement, the weld pool 26 and the shielding gas 16 move with the welding torch 12. The arc 24 melts more metal of the workpiece 25 to mix with melted electrode 20 in the direction of movement 30 and leaves the weld pool 26 to cool in the wake of movement 30 of the torch 12. As the weld pool 26 cools, a weld joint 32 is formed. While not shown, it will be appreciated that two or more workpieces may be joined together by the weld joint 32. Further, while the orientation of the torch 12 relative to the workpiece 25 is at a non-orthogonal angle so that the torch 12 is said to "push" the weld pool 26, embodiments of the present invention are not limited to the specific orientation shown. The torch 12 may be oriented relative to the weld pool 26 in any orientation sufficient to form the weld joint 32, including those orientations in which the torch 12 is said to "pull" the weld pool 26.

The gas barrier 22 and its relationship to the weld pool 26 may influence the quality of the weld joint 32. The gas barrier 22 is maintained around the weld pool 26 by a flow of shielding gas from the nozzle 18. In each particular welding process, there is a characteristic minimum flow of shielding gas flow that maintains the gas barrier 22 of sufficient volume to protect the weld pool 26 from the atmospheric gases 28. Reduction in the shielding gas flow below the minimum flow for that particular weld process exposes the weld pool 26 to atmospheric gases 28. In the case in which the gas barrier 22 does not sufficiently protect the weld pool 26, the atmospheric gases 28 may react or otherwise form undesirable constituents with the hot metals in the weld pool 26. As a result, the properties of the weld 32 may be insufficient in one way or another so as to be of poor quality. By way of example, poor quality welds include welds with significant nitrogen absorption that ultimately causes porosity o holes in the weld 32, which lowers the strength of the weld 32.

In the case in which the gas barrier 22 is oversized relative to the weld pool 26, excess shielding gas is consumed. While the gas barrier 22 may sufficiently protect the weld pool 26 from the atmospheric gases 28, no measurable benefit to the welding process or to the weld 32 may be observed for the excess shielding gas. Excess shielding gas, however, increases the cost of the weld 32. The flow of the shielding gas from the nozzle 18 influences the size of the gas barrier 22.

In general, as the flow of shielding gas decreases, the size of the gas barrier 22 decreases and vice versa. Other factors may also influence the minimum size of the gas barrier 22 required during welding. By way of example and not limitation, the power supplied to the electrode 20 to generate the arc 24, the distance from the electrode 20 to the workpiece 25, the travel speed in the direction of movement 30, the design of the weld 32, the geometry of the workpiece 25, and the location and freedom from wind drafts on the gas barrier 22 may affect the minimum size of the gas barrier 22. Prior art flow control procedures failed to consider control of the shielding gas flow under many or all of these variations in the welding processes.

According to embodiments of the present invention, the system 10 maintains the gas barrier 22 at or slightly above the minimum size necessary to provide a quality weld joint 32. By considering any single one or all of the variables identified in the preceding paragraph, the system 10 may predetermine and set the shielding gas flow rate during a welding process. For example, because the minimum required size of the gas barrier 22 may change from one welding sequence to the next sequence, the system 10 is capable of changing the shielding gas flow rate on a per weld sequence basis and even on a per weld basis. Thus, the system 10 may change the shielding gas flow rate to meet the minimum size of gas barrier 22 required for a particular weld. In this manner, the system 10 minimizes the welding costs by reducing or eliminating excess shielding gas consumption.

To that end and with reference to FIG. 1, embodiments of the system 10 include an electro-mechanical machine in the exemplary form of a robot 40 onto which the welding torch 12 may be secured. However, it is not necessary to utilize a robot as other machines capable of manipulating the welding torch 12 relative to the workpiece 25 are known. Other machines may include one or more servo motors capable of repeatedly tracing the torch 12 relative to a workpiece 25 along a programmed path. Although not shown, the workpiece 25 may be secured to a separate electro-mechanical machine so that, in conjunction with movement of the robot 40, the workpiece 25 may also be moved so as to provide relative movement between the workpiece 25 and the welding torch 12. Furthermore, while the welding torch 12 is shown secured to the robot 40, it will be appreciated that the robot 40 may be configured to hold the workpiece 25 and move it relative to a fixed or movable welding torch. As is known, the robot 40 may be computer programmable.

In that regard, the welding system 10 may include a control system 42 operably coupled to the robot 40. The control system 42 may include a computer (not labeled) and a teach pendant 44 or another off-line programming software system (not shown) that may be used to generate a welding program, including the trajectory for the robot 40, in combination with controlling the associated equipment needed to form a weld. The trajectory may include coordinates in a space defined by the workpiece 25 and may be stored in the control system 42 or in the robot 40. During a welding sequence, the control system 42 may command the robot 40 to follow the predefined trajectory or path as well as coordinate other components (described below) with the trajectory to form the weld joint 32. According to one embodiment, the welding program may include user selectable shielding gas flow rates on a per weld basis, as well as other user selectable variables, that are input through the teach pendant 44 or from off-line programming.

With continued reference to FIG. 1, the system 10 may include a feeder 50 for metering a controlled amount of filler material into the weld pool 26 (FIG. 2). The feeder 50 may be operably coupled to the welder 14 and/or the control system 42. In conjunction with movement of, and welding with, the torch 12 along a predetermined trajectory, one of the welder 14 and/or the control system 42 may communicate with the feeder 50 so as to cause the feeder 50 to dispense filler material to fill the weld pool 26 according to a predetermined target concentration of filler metal. As shown, the feeder 50 may be coupled to the robot 40 or may be placed in another location proximate the torch 12. In the exemplary embodiment where the torch 12 is a MIG torch, the feeder 50 may be a wire feeder for metering the electrode 20 into the weld pool 26. It will be appreciated that the welding torch 12 may be a TIG torch, in which case the feeder 50 may be configured to meter filler metal into the weld pool formed between a tungsten electrode and a workpiece.

In conjunction with operation of the feeder 50, the system 10 controls the flow of the shielding gas from the gas supply 16 through a gas delivery system 54 to the nozzle 18 (FIG. 2) of the welding torch 12. In one embodiment, the control system 42 coordinates the on-off control of the shielding gas flow with a solenoid 55 (optional) and may change the shielding gas flow during welding, such as, on a per weld basis. The solenoid 55 may be an on-off flow control device.

With regard to the gas flow during welding, in one embodiment, the gas delivery system 54 may include a shielding gas controller (described below and indicated generally at 56) that receives set point information regarding a minimum predetermined shielding gas flow. It will be appreciated that while exemplary embodiments of the shielding gas controller are described herein, embodiments of the system 54 are not limited to the specific gas controllers described. One or more pipes or lines 58 fluidly couple the solenoid 55 and the shielding gas controller 56 to the shielding gas supply 16 at one end and to the nozzle 18 of the welding torch 12 at the other end. By way of example only, the lines 58 may be rated to at least 350 psi, such as, the "GSS" hose available from WA Technology, to minimize expansion under internal pressure from the shielding gas and may reduce pressure surges during on-off cycling of the shielding gas flow. In one embodiment, the shielding gas controller 56 controls the flow rate of the shielding gas from the nozzle 18 prior to welding, during welding of each individual weld joint of a weld sequence, and/or after welding. Specifically, prior to welding during arc start, during welding of a workpiece, and/or following welding during arc end, the shielding gas controller 56 may change the flow of shielding gas from the nozzle 18.

Figure 3A:
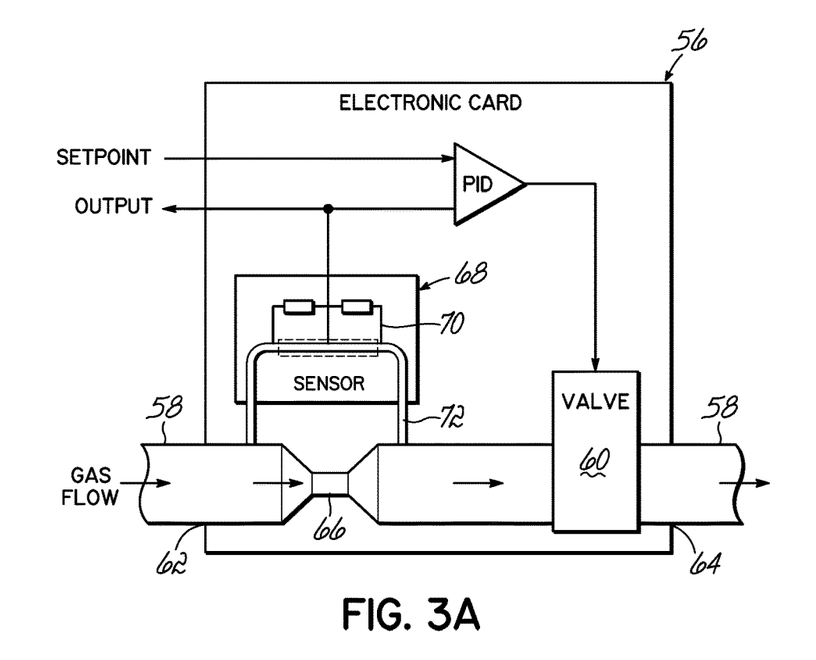
FIG. 3A is a schematic of a shielding gas controller according to one embodiment of the invention.

To these and other ends, in one embodiment and with reference to FIGS. 1 and 3A, an exemplary shielding gas controller 56 includes a valve 60 between an inlet 62 and an outlet 64. The valve 60 is capable of changing the shielding gas flow in the gas delivery system 54. The valve 60 is in operative communication with the control system 42 from which the shielding gas controller 56 receives set point information.

As shown, in one embodiment, the shielding gas controller 56 may include a flow restriction 66 between the inlet 62 and the outlet 64. The shielding gas controller 56 produces an output for the control system 42 from a feedback circuit 68 that includes a feedback sensor 70 and a bypass pipe 72. The bypass pipe 72 is in fluid communication around the flow restriction 66 so that a small portion of the flow of gas passing through inlet 62 is bypassed around the flow restriction 66 and into operative communication with the feedback sensor 70. The feedback circuit 68 outputs a signal to the control system 42 that is indicative of the flow of gas through the shielding gas controller 56. It will be appreciated that the feedback circuit 68 may provide an indication of volume and/or mass flow of gas flowing from the outlet 64.

In the exemplary shielding gas controller 56, the feedback sensor 70 may include a heater that heats the gas passing through the bypass pipe 72. By heating the gas in the bypass pipe 72, it is possible to measure the mass flow of the shielding gas passing through the shielding gas controller 56 by the First Law of Thermodynamics. The feedback sensor 70 may then produce an output, such as an electrical signal, indicative of the shielding gas flow rate from the outlet 64. That output may be used to adjust the valve 60 and may also be communicated to the control system 42. The control system 42 may utilize this information to determine the shielding gas consumption of the system 10 per unit time, which may then be made visible to the operator on the teach pendant 44. Further, as is described in more detail below, the output may be used as for one or more qualitative and/or quantitative assessment of the operation of the torch 12. In one embodiment, the shielding gas controller 56 is a mass flow controller, which is commercially available from MKS Instruments of Andover, Mass., as model No.GE0A004504R8V020.

In operation, the exemplary shielding gas controller 56 may change the flow of the shielding gas passing from the outlet 64 by adjusting the valve 60 in response to set point information received from the control system 42. This change may be based on the quality of the weld during a weld sequence, on a per weld basis, or on another factor, as is described in detail below. By way of example, the valve 60 may include a variable orifice (not shown) that is capable of changing the flow of the shielding gas from the outlet 64. The change in the size of the variable orifice may be based upon the output from the feedback circuit 68. In particular, the shielding gas controller 56 may use a control scheme (e.g., PID control) to change the size of the variable orifice in the valve 60 until the flow from the shielding gas controller 56 reaches a predetermined minimum gas flow as determined by the set point from the control system 42.

Figure 3B:
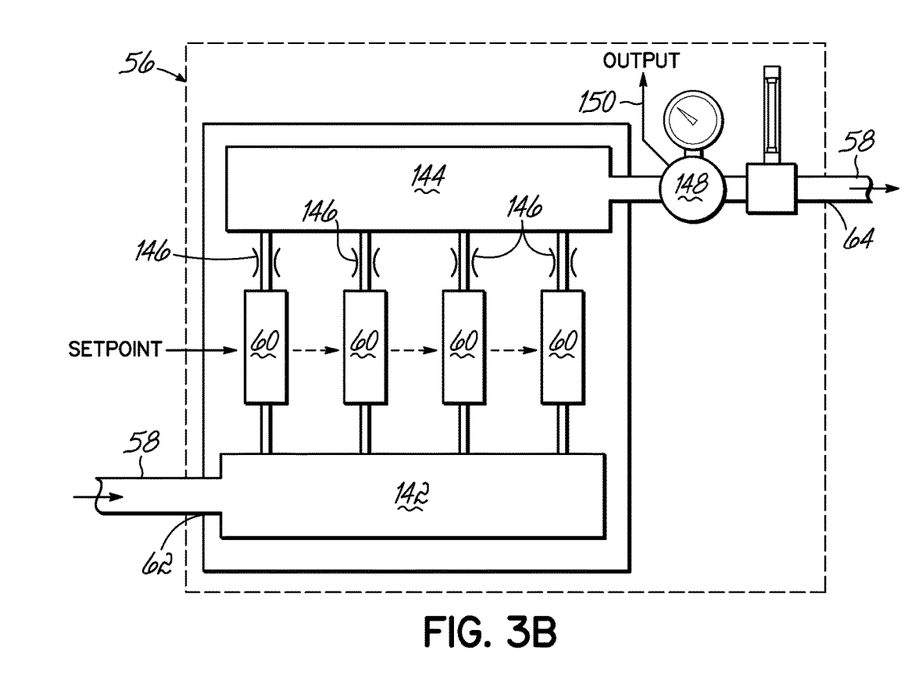
FIG. 3B is a schematic of a shielding gas controller according to one embodiment of the invention.

In one embodiment and with reference now to FIGS. 1 and 3B, an exemplary shielding gas controller 56 includes one or more valves 60 between an inlet 62 and an outlet 64. Valves 60 may be fluidically coupled between gas manifolds 142, 144. In one embodiment, each valve 60 may be a pneumatic valve coupled with a solenoid that receives set point information in the form of electrical power from the control system 42 or another source, the power being sufficient to cause the solenoid to open the valve and allow gas to pass from one manifold 142 to the other manifold 144 and thus operate so as to switch the shielding gas on within the controller 56. Removing the power from the valve 60, turns the valve 60 off.

The exemplary gas controller 56 of FIG. 3B may further include one or more flow restrictors 146. The flow restrictors 146 may include an orifice of a predetermined size that is capable of restricting the flow of the shielding gas to a known value. The flow restrictors 146 may operate to limit gas flow to a known predetermined rate at a wide range of pressures within the gas controller 56. By way of example only, the flow restrictors 146 may be available commercially from Mott Corporation, Farmington, Conn., and the valves 60 may be commercially available from Asco Valves, Warren Mich.

In the embodiment shown in FIG. 3B, there is one flow restrictor 146 for each valve 60. It will, however, be appreciated that the number of flow restrictors 146 and the number of valves 60 need not be equal. Embodiments of the present invention are not limited shielding gas controllers having four valves and four corresponding flow restrictors, as other combinations of valves and flow restrictors may be utilized as is set forth below.

In operation, exemplary shielding gas controller 56 shown in FIG. 3B may change the flow of shielding gas passing from the inlet 62 to the outlet 64 by opening one or more valves 60 in response to set point information received from the control system 42. The valves 60 may be selected depending on the associated flow restrictor 146. For example, one flow restrictor 146 may be configured to allow 10 cubic feet per hour (CFH) of shielding gas flow pass from manifold 142 to manifold 144 when the intervening valve 60 is opened. Thus, if a flow rate of 10 CFH of shielding gas is required, the valve 60 associated with the 10 CFH flow restrictor may be opened. Where multiple flow restrictors 146 are utilized, each one may permit a different predetermined shielding gas flow rate.

In this regard, continuing with the example above, a second flow restrictor 146 may be configured to allow 15 CFH of shielding gas flow pass from manifold 142 to manifold 144 when a different intervening valve 60 is opened. In this instance, if the control system 42 requires 15 CFH of shielding gas flow, the control system 42 opens the valve 60 associated with the 15 CFH flow restrictor while keeping the valve 60 associated with the 10 CFH flow restrictor and any other valves closed. In a further example, if the control system 42 requires 25 CFH of shielding gas flow, the control system 42 opens each of the valves 60 corresponding to the 10 CFH flow restrictor and the 15 CFH flow restrictor. That is, the system 42 opens the valve associated with the 10 CFH flow restrictor, and the system 42 opens the valve 60 associated with the 10 CFH flow restrictor. The combination of the 10 CFH flow rate and the 15 CFH flow rate provides the 25 CFH of shielding gas flow. By way of additional example, in embodiments having four valves 60 and four flow restrictors 146, as shown, the additional flow restrictors 146 may be configured to allow the same shielding gas flow or a different from the previous flow restrictors 146, described above. By opening and closing valves 60 for a known flow restrictor 146, the control system 42 may control the shielding gas flow in the gas delivery system 54.

With continued reference to FIG. 3B, the exemplary shielding gas controller 56 may include a flow meter 148 coupled to the manifold 144. The flow meter 148 may be configured to measure the flow rate of the shielding gas and then provide feedback via a signal 150 related to the flow rate of the shielding gas being discharged from the outlet 64. In this way, the flow meter 148 in combination with the valve 60 and selected flow restrictor 146 may be used for one or more qualitative and/or quantitative assessments of the operation of the torch 12, described below. The control system 42 may then alter the set point information and open and/or close one or more of valves 60 to change the actual shielding gas flow rate based on this feedback.

Figure 3C:
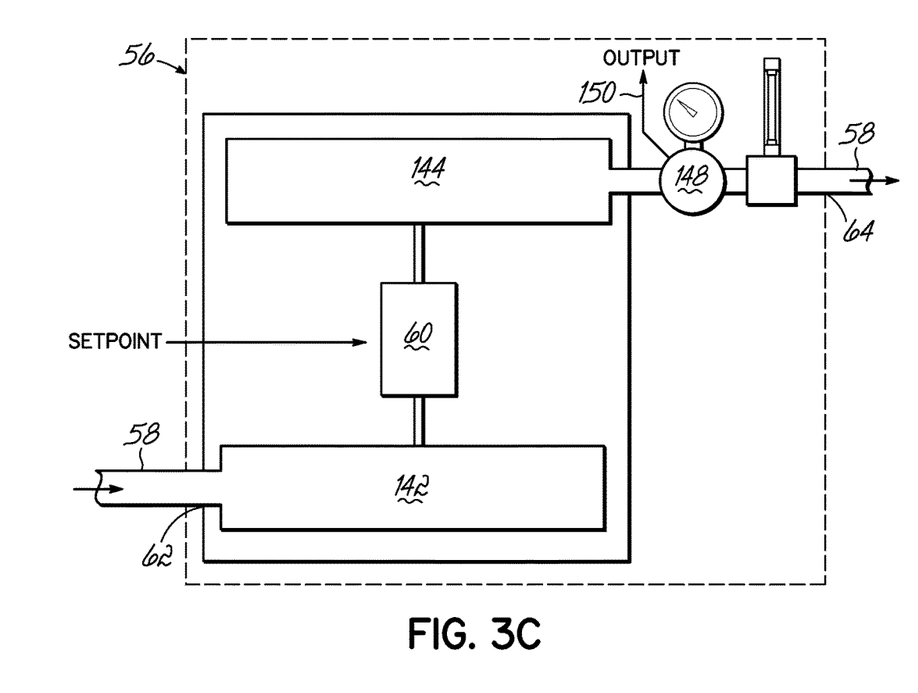
FIG. 3C is a schematic of a shielding gas controller according to one embodiment of the invention.

In one embodiment and with reference now to FIGS. 1 and 3C, an exemplary shielding gas controller 56 includes a valve 60 between the inlet 62 and the outlet 64. The valve may couple the manifold 142 to the manifold 144 and be configured to variably open to adjust the shielding gas flow rate across a continuous regime of flow rates.

In this regard, the control system 42 may provide set point information to change the flow rate of shielding gas flowing from the outlet 64. This change may be based on the quality of the weld during a weld sequence, on a per weld basis, or on another factor, as is described in detail below. By way of example, the valve 60 may include a variable orifice (not shown) that is capable of changing the flow of the shielding gas from the outlet 64. The change in the size of the variable orifice may be based upon the output from the feedback circuit 68. In particular, the shielding gas controller 56 may use a control scheme (e.g., PID control) to change the size of the variable orifice in the valve 60 until the flow from the shielding gas controller 56 reaches a predetermined minimum gas flow as determined by the set point from the control system 42. In one embodiment, the valve 60 may be a proportional valve available commercially from ASCO, Florham Park, N.J.

The exemplary gas controller 56 shown in FIG. 3C may also include the flow meter 148 to provide feedback via the signal 150. The control system 42 may then proportionally alter the set point information to adjust the gas flowing from the outlet 64 based on a known control scheme, such as PID control. In this way, the flow meter 148 in combination with the valve 60 may be used for one or more qualitative and/or quantitative assessments of the operation of the torch 12, as is described below.

In one embodiment, the flow of shielding gas is controlled in a manner that is essentially independent of the pressure from the gas supply 16 and from the pressure of the shielding gas at the outlet 64 of the shielding gas controller 56. In this regard, the shielding gas controller 56 may provide a dynamic, closed-loop control of the shielding gas flow and respond to upstream variations in pressure while still maintaining consistent shielding gas flow rates from the outlet 64. By way of example, the consistency of shielding gas flow may be a variation of less than about 8%, and by way of additional example less than about 4%, during the course of welding utilizing a full cylinder of shielding gas with a single stage pressure regulator and a flow meter until that cylinder is empty.

In one embodiment of the invention, the shielding gas controller 56 may have a pressure rating that exceeds the pressure rating of the gas supply 16. Accordingly, embodiments of the system 10 may not include a pressure gauge 74 (shown in FIG. 1). However, where the pressure of gas supply 16 is above 2,200 psi, for example, the pressure gauge 74 may be required. In addition, or alternatively, embodiments of the system 10 may not include a flow meter 76 between the gas supply 16 and the shielding gas controller 56 when pressure in the gas supply 16 is at normal levels (e.g., less than about 100 psi). Unlike prior art gas flow systems in which a pressure drop in the supply line upstream of the flow control would likely cause a reduction in flow, embodiments of the present invention advantageously maintain a consistent flow rate from the shielding gas controller 56 in the event that the gas pressure at the inlet 62 of the shielding gas controller 56 is unexpectedly reduced.

To that end, the shielding gas controller 56 may react to a reduction in pressure at or near the inlet 62 of the shielding gas controller 56. In response, the shielding gas controller 56 may adjust the valve 60 or open/close one or more valves 60 to select one or more different flow restrictors 146 to maintain the shielding gas flow from the outlet 64 at the minimum predetermined shielding gas flow set point.

An opposite response may be observed for increases in pressure upstream of the shielding gas controller 56. That is, an increase in pressure at the inlet 62 may cause the shielding gas controller 56 to reduce the size of the orifice in the valve 60 or open/close one or more valves 60 to maintain a constant flow from the outlet 64. In the case of an increase or reduction in pressure upstream of the shielding gas controller 56, the feedback to the control system 42, such as, the signal from the sensor 70 or the signal from the flow meter 148, may be used to change in the size of the orifice in the valve 60 according to the gas controller 56 shown in FIGS. 3A and 3C or be used to open/close one or more of the valves 60 in the gas controller 56 shown in FIG. 3B. In addition, or as an alternative, the feedback may be transmitted to and utilized by the control system 42 to provide a warning to an operator of a possible pressure problem. The system 10 may account for other gas pressure fluctuations to maintain quality welds while reducing consumption of shielding gas.

Prior to welding there may be an excess amount of shielding gas within the gas delivery system 54. This excess gas may be due to elasticity in the gas delivery system 54, such as, expansion of hoses or piping, or for other reasons. In this case, at arc start, when the control system 42 initiates shielding gas flow through the gas delivery system 54, the excess gas built up in the pipes or lines 58 may be expelled from the nozzle 18 generally in an uncontrolled manner. This gas surge from the nozzle 18 is wasteful. It may also cause welding problems by disturbing the laminar flow of gas in the torch 12, which may disturb the arc, and/or the surge may produce the venturi effect between the nozzle 18 and the workpiece 25 that may pull atmospheric gases into the gas barrier 22. Each of these problems may manifest itself in a poor quality weld and/or reduced productivity. It will be appreciated that the amount of excess gas that is expelled from the gas delivery system 54 at the nozzle 18 may depend upon the length of the pipes or lines 58, the pressure on the inlet side of the shielding gas controller 56, and the rigidity (i.e., resistance to expansion) of the lines 58, among other factors.

In view of these problems, in one embodiment of the present invention, the shielding gas controller 56 compensates for overly high gas pressure in the gas delivery system 54 prior to or at arc start. By way of example, and with reference to FIG. 3A, the variable orifice in the valve 60 may initially be set to a relatively smaller size at the arc start than the variable orifice size used during welding. That is, the shielding gas flow at arc start may be set to less than the shielding gas flow used during welding. By way of example, the initial size of the variable orifice may be larger or smaller by a known fraction or known percentage than the size required for the initial weld. Advantageously, minimizing gas surges prior to or at the initiation of arc start minimizes total gas consumption and may address weld quality problems associate with arc start.

By way additional example, and with reference to FIG. 3B, the control system 42 may initially open one or more valves 60 so as to preselect one or more flow restrictors 146 that limit the surge of gas. This methodology may be particularly useful when there is a known amount of surge of gas in the gas delivery system 54. For example, on initial arc start sequence, the flow meter 148 may measure the actual flow so that the system 42 records the search flow in the system for that arc start. On subsequent arc starts, the system 42 can compensate for any surge flow by opening/closing the valves 60 to compensate for any gas surge flow.

During welding, the shielding gas controller 56 may detect issues that affect shielding gas flow downstream of the outlet 64. In one embodiment, the shielding gas controller 56 improves the weld quality consistency by responding to downstream shielding gas pressure fluctuations. For example, a hose 78 between the outlet 64 and the torch 12 may get pinched causing an increase in the back pressure to the shielding gas controller 56. While this would normally cause a reduction in gas flow from the nozzle 18 and, consequently, may negatively affect weld quality, the shielding gas controller 56 may detect a reduction in shielding gas flow from the backpressure due to the pinch and then open the valve 60, according to the gas controller 56 shown in FIGS. 3A and 3C, or open one or more valves 60 associated with the flow restrictors 146, according to the gas controller 56 shown in FIG. 3B, to compensate for reduced gas flow due to the pinched hose. In one embodiment, the percentage change in the size of the variable orifice in the valve 60 of the gas controller 56 of FIGS. 3A and 3C or a change in the number and/or selection of the valves 60 of the gas controller 56 of FIG. 3B to maintain the shielding gas flow at the minimum predetermined shielding gas flow set point may be detected and that data transmitted to the control system 42, which may then alert the operator of the pinch in the hose 78.

By way of additional example, it is known that weld spatter can build up on the nozzle 18 during welding. The spatter may reduce the area of the nozzle 18 and, if left unchecked, may eventually throttle the flow of shielding gas from the nozzle 18. The spatter may also cause heat buildup in the torch 12. In response to a reduction in flow from the nozzle 18 due to build up of spatter, the shielding gas controller 56 may increase the size of the variable orifice in the valve 60 of the gas controller 56 of FIGS. 3A and 3C or change the number and/or selection of the valves 60 of the gas controller 56 of FIG. 3B to compensate for the flow reduction. Thus, the shielding gas controller 56 may offset the negative effect of spatter on the flow of shielding gas.

Furthermore, based upon the relative increase in the size of the variable orifice in the valve 60 of the gas controller 56 of FIGS. 3A and 3C or change the number and/or selection of the valves 60 of the gas controller 56 of FIG. 3B, the control system 42 may predict when a restriction, such as, spatter on the nozzle 18, in the gas delivery system 54 becomes problematic with regard to weld quality. This predetermined limit may be established by observing weld quality and correlating it with the quantity of spatter on the nozzle 18. Once the change in the size of the variable orifice of the valve 60 of the gas controller 56 of FIGS. 3A and 3C or the change in the number and/or selection of the valves 60 of the gas controller 56 of FIG. 3B so that the gas flow rate exiting from the outlet 64 reaches that predetermined limit, the control system 42 may signal to the robot 40 that there is a problem. The robot 40 may then execute a nozzle reaming program between weld sequences, or at another time, to remove the spatter from the nozzle 18. Unlike prior art nozzle reaming processes, which are often based on anticipated spatter after a set number of welds, embodiments of the present invention may be responsive to actual spatter in the nozzle 18. Embodiments of the invention may therefore eliminate or reduce spatter rings on the weld structure while maintaining weld quality. In addition, by reaming the nozzle 18 only on an as-needed basis, rather than on a set frequency, the nozzle 18 may not be exposed to as much wear and tear and may require replacement on a less frequent basis.

In addition to or as a part of the nozzle cleaning process, as is shown in FIG. 1, a compressed air supply 80 may be fluidly coupled to the torch 12 via an air supply line 82. The compressed air supply 80 may be separated from the torch 12 by a solenoid 84. In one embodiment of the invention, following the nozzle cleaning process described above, the control system 42 may activate the solenoid 84 to allow compressed air to flow through the torch 12. This post-nozzle cleaning process may remove any debris in the nozzle 18 after cleaning. In one embodiment, the control system 42 may activate the solenoid 84 after welding every structure, after every weld sequence, or after each weld. The compressed air may blowout any spatter ring on the nozzle 18 and may cool the torch 12 between welding processes, between weld sequences, and/or between welds. This process may improve weld quality and may prolong the life of the torch 12 by keeping the nozzle 18 cooler. Advantageously, spatter is less likely to stick to a cool nozzle such that the nozzle reaming process is required less often.

In one embodiment, the system 10 includes a capability of quantitatively inspecting the condition of the torch 12 on a periodic or an as-needed basis and, optionally, without operator involvement. Specifically, and by way of example, the welding torch 12 may include one or more O-rings (not shown) to prevent inadvertent leakage of the shielding gas other than through the nozzle 18. These O-rings may be generally located at the back end of the torch 12 opposite the nozzle 18 around a power pin (not shown) for the feed wire. During normal welding torch maintenance, the torch 12 may be taken off, inspected, and reinstalled. Removal and reinstallation of the torch 12 on the feed wire increases the probability that the O-rings become damaged or otherwise compromised, which may allow shielding gas to leak from the wrong end of the torch 12. Damaged O-rings may ultimately cause the system 10 to consume more shielding gas than is necessary. Embodiments of the present invention may be capable of detecting damaged or compromised O-rings or other leakage of shielding gas at undesirable locations in the gas delivery system 54.

Figure 5:
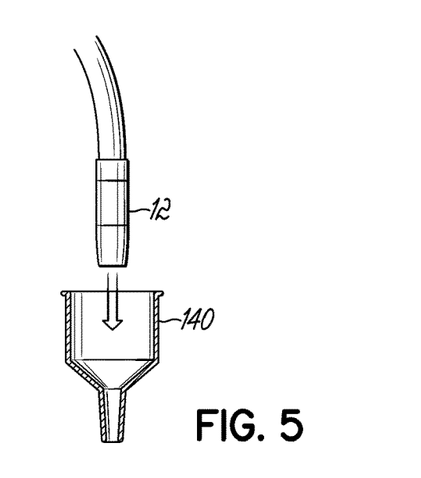
FIG. 5 is a side elevation view of a funnel-like device for use with a welding torch according to one embodiment of the invention.

In this regard, and in one embodiment, the control system 42 may include a program by which the robot 40 inserts the torch 12 into a series of devices of increasingly restrictive gas flow. Once the nozzle 18 is inserted, the control system 42 may turn on the gas flow from the nozzle 18 and then measure the gas flow. By measuring the shielding gas flow rate through the torch 12 at various levels of obstruction, it may be possible to identify maintenance problems and/or more accurately gauge useful life spans and schedule preventive maintenance for components of the system, such as, the O-rings in the torch 12. By way of example, and with reference to FIG. 5, the torch 12 may be inserted into a funnel-like device 140 having a 100% restriction (i.e., complete blockage of flow). If gas flow is maintained at 100% through the torch 12 when the nozzle 18 is blocked, then the O-rings are not sealing the torch 12. That is, there is 100% shielding gas leakage through the back end of the torch 12 or at another undesirable location because the gas delivery system 54, including the torch 12, is unable to contain an increased pressure associated with a zero flow condition (i.e., 100% restriction). Advantageously, automatic inspection of the torch 12 may facilitate preventive maintenance of the gas delivery system 54 and, consequently, may improve weld quality while reducing downtime associated with emergency maintenance.

In one embodiment of the invention, the gas delivery system 54 includes a sensor 86 between the gas supply 16 and the shielding gas controller 56. The sensor 86 is capable of determining the content of the gas delivery system 54. In particular, sensor 86 may determine the impurity level, such as, the amount of nitrogen, within the gas delivery system 54. Prior to welding, the sensor 86 may measure the concentration of nitrogen and may determine whether the content of the gas delivery system 54 is sufficient to provide the gas barrier 22 necessary for a quality weld. In the event that the content of the gas delivery system 54 contains too many impurities, such as too much nitrogen, the control system 42 may initiate a purge of the gas delivery system 54 with the shielding gas until the sensor 86 indicates that the constituents of the gas delivery system 54 are capable of providing the necessary gas barrier 22. Once the gas delivery system 54 is sufficiently purged, the control system 42 may initiate a welding process. And, during welding, the sensor 86 may provide periodic or continuous monitoring of the gas quality from the gas supply 16. If the gas quality deteriorates, for example, due to a leak in the gas delivery system 54 upstream or even downstream from the sensor 86, the sensor 86 may signal the control system 42 of the poor quality gas. The control system 42 may then shut down the welding operation to prevent poor weld quality or damage to the system 10.

As set forth above, the shielding gas controller 56 may change the flow of shielding gas during welding. For example, the flow of shielding gas during welding of the first weld sequence or a first joint may be higher than the flow of shielding gas during welding of the subsequent weld sequence or a subsequent weld joint or vice versa.

As is known, a weld sequence is a predefined order in making a plurality of individual welds on a structure. In other words, a weld sequence is an order to and direction in which individual welds are made on the structure. A weld sequence may be designed to minimize residual stresses that may produce distortion and deformation in the final welded structure. By way of example and reference to FIG. 4A, an exemplary weld sequence 100 for joining workpieces 102 and 104 is shown. The weld sequence 100 includes individual weld joints 106, 108, and 110. The location and order in which the weld joints 106, 108, and 110 are formed may be predetermined. The determination of the order in which the weld joints 106, 108, and 110 are formed may minimize distortion caused by localized heating of the workpieces 102 and 104 during welding. For example, the weld sequence 100 may include welding the weld joint 108 as a first weld, welding the joint 106 as a second weld, and welding the joint 110 as a third weld. It will be appreciated that the weld joints 106, 108, and 110 may be formed in any predetermined order according to the weld sequence 100. While individual, separate welds are shown, the weld joints 106, 108, and 110 may collectively form one continuous weld between the workpieces 102 and 104 via, for example, a backstep welding process.

Figure 4A:
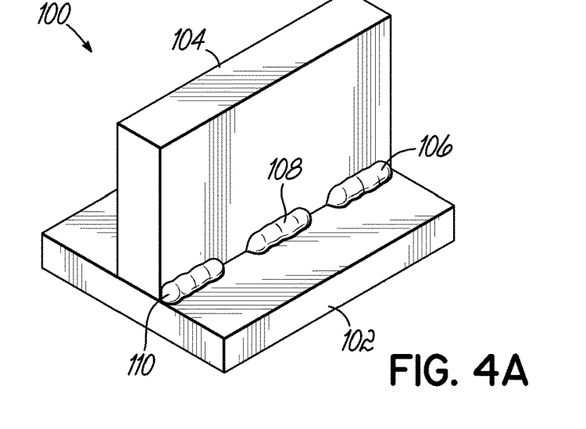
FIGS. 4A and 4B depict different exemplary weld geometries and weld sequences.
Figure 4B:
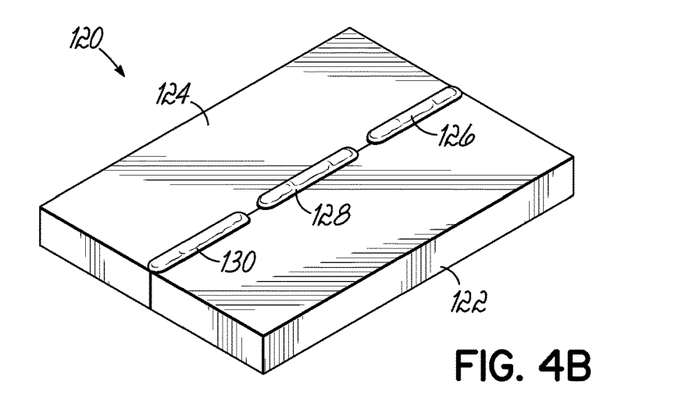

By way of additional example and with reference to FIG. 4B, another exemplary weld sequence 120 for joining workpieces 122 and 124 is shown. The weld sequence 120 includes individual weld joints 126, 128, and 130. The location and order in which the weld joints 126, 128, and 130 are formed may be predetermined in the weld sequence 120. The determination of the order may depend on minimizing distortion in the welded structure. For example, the weld sequence 120 may include welding the joint 128 as a first weld, welding the joint 126 as a second weld, and welding the joint 130 as a third weld. It will be appreciated that the weld joints 126, 128, and 130 may be formed in any predetermined order according to the weld sequence 120. While individual, separate welds are shown, the weld joints 126, 128, and 130 may collectively form one continuous weld between the workpieces 122 and 124 via, for example, a backstep welding process.

According to embodiments of the present invention, the shielding gas controller 56 may change the shielding gas flow on a per weld basis. That is, the shielding gas controller 56 may reduce the shielding gas flow or increase the shielding gas flow based on the geometry of the workpieces, based on their arrangement, based on the composition of the gaseous atmosphere surrounding the workpieces, or due to another reason. For example, and with reference to FIGS. 4A and 4B, considering the weld sequences 100 and 120, the shielding gas controller 56 may change the flow of shielding gas from the nozzle 18 between the weld sequence 100 and the weld sequence 120.

In this case, the shielding gas controller 56 may increase the shielding gas flow following completion of the weld sequence 100 and before initiation of the weld sequence 120. Without being bound by theory, it is contemplated that the minimum required shielding gas flow necessary to provide a quality weld joint in the weld sequence 100 may be less than the minimum required shielding gas flow necessary to provide a quality weld joint in the weld sequence 120. This may be true even though all of the other welding parameters remain constant. For example, if the weld is a butt weld (as is shown in FIG. 4B) and is open to external gas drafts, the required shielding gas flow may be about 50 CFH for the weld pool to be properly shielded. If the weld is a fillet weld (as is shown in FIG. 4A) and is shielded from external drafts by virtue of its geometry, the required shielding gas flow may be as low as about 15 CFH to about 20 CFH.

The required shielding gas flow may also depend on the type of shielding gas. For example, if the shielding gas is 100% carbon dioxide ($CO_2$), which is heavier than air, it is possible that the minimum shielding gas flow required will be lower than the previous values. The change in gas flow between one weld sequence and the next may be at least about 5% and by way of further example may be between about 10% and about 20%. In this regard, the arrangement of the workpieces 102 and 104 relative to one another may minimize the minimum shielding gas flow requirement by virtue of a reduced volume of the weld pool 26 exposed during welding as compared to the weld pool 26 formed during welding of the butt joint depicted in FIG. 4B. Furthermore, air drafts are less likely to perturb the gas barrier 22 due to the barrier provided by the geometry of the workpieces 102 and 104 relative to placement of the weld sequence 100. It will be appreciated that the butt joint of the workpieces 122, 124 shown in FIG. 4B lacks any draft protection similar to that provided by the workpieces 102, 104 during the weld sequence 100 shown in FIG. 4A.

In addition, or alternatively, the shielding gas controller 56 may change the flow of shielding gas during the weld sequence 100. The shielding gas controller 56 may change the flow of shielding gas between any two of the weld joints 106, 108, and 110, such as, between weld joint 108 and weld joint 106 or between weld joint 106 and weld joint 110. It will be appreciated that the shielding gas controller 56 may change the flow of shielding gas between each of the weld joints 106, 108, and 110. Similarly, the shielding gas controller 56 may change the flow of shielding gas during the weld sequence 120, such as, between any two of the weld joints 126, 128, and 130 or between each of the weld joints 126, 128, and 130.

The changes to the shielding gas flow between any two weld sequences or during a weld sequence between any two welds may be according to predetermined shielding gas flow settings for that particular weld sequence or for each of the welds in a particular sequence, as is described below.

Further in this regard, during a succession of weld sequences, the ambient gaseous atmosphere surrounding the workpieces may change. That is, as shielding gas flows to create the barrier 22, the gas may buildup generally around the workpieces and thereby generally displace contaminant gases from around the workpiece. This may be particularly true in the case where the workpieces are within an enclosed environment with a welding robot. Because the contaminant gases are generally displaced from an enclosed environment, the shielding gas flow rate may be reduced. In other words, once the environment immediately surrounding the workpieces becomes generally favorable for welding, less shielding as is required to provide the gas barrier 22. External inputs, such as, from gas sensors and the like, described below, within a welding cell, may be used to detect the buildup of shielding gas, that information may be utilized by the control system 42 to reduce the shielding gas flow rate during welding.

In addition to gas sensors, other external inputs may be based upon the amount of time between the last weld sequence and the current weld sequence. In general, during production, in which shielding gas is discharged proximate a workpiece, there may be a buildup of shielding gas in the vicinity of the robot. This buildup may displace contaminant gases from the general vicinity of the workpiece. Depending on the rate of discharge of the shielding gas and the volume of the work cell, the shielding gas may dissipate at a relatively slow rate. Therefore, once an environment consisting of a large portion of shielding gas builds up around the workpiece, the control system 42 may reduce the shielding gas flow because less shielding gas flow may be required to form the gas barrier 22. For example, they are may be numerous weld sequences with time between the weld sequences in which no shielding gas flows from the torch 12. When the time between weld sequences short, the shielding gas flow rate may be reduced because the shielding gas generally surrounding the workpiece may dissipate at a rate slower than the rate at which the shielding gas is added to the environment around the workpieces.

In a similar notion, if there is a large wait period between successive welds, the shielding gas may dissipate from around the workpieces. Accordingly, in this situation, a subsequent weld sequence may require a greater amount of shielding gas flow to obtain the gas barrier 22 than the situation in the immediately preceding paragraph. In a situation in which the wait period is relatively long, the shielding gas flow rate may not be reduced significantly. However, in a situation in which the wait period is relatively short and the shielding gas may build up around the workpiece and the shielding gas flow rate may be reduced significantly while maintaining weld quality. Therefore, in view of the above and in one embodiment, an external input may include monitoring the amount of time between successive weld sequences and compensating the shielding gas flow rate depending on the measured time between weld sequences.

By way of way of additional example, other external inputs may include a direct input from a sensor (not shown) capable of monitoring the composition of the atmospheric gases proximate workpieces. For example, the sensor may measure the amount of shielding gas surrounding the workpiece and that measurement may be utilized to change the shielding gas flow rate necessary to protect the weld pool 26. By way of further example, the sensor may measure the amount of contaminant gases surrounding the workpiece and that measurement may be utilized to change the shielding gas flow rate by an amount sufficient to maintain the gas barrier 22 around the weld pool 26.

In addition to changes in geometry and the ambient gas environment associated with a weld joint (described above), the change in the shielding gas flow may be in response to a change in the electric stick out (ESO). With reference to FIG. 2, during a welding process, the distance from the end of the nozzle 18 to the workpiece 25 may be controlled by the operator during programming of the weld. This distance may be intentionally adjusted or varied due to process conditions during welding. If the shielding gas flow is not similarly adjusted, poor weld quality may be the result. In one embodiment of the invention, the shielding gas flow set point may be changed in accordance to an increase or a decrease in the ESO. This change could be in response to observing changes in the ratio of the wire feed speed to welding amperage, which is related to ESO. In the situation where the wire feed speed is held constant and the ESO increases, due to an increase in the distance between the nozzle 18 and the workpiece 25, the welding amperage will normally decrease. For example, for a 1.2 mm diameter electrode, as ESO increases from about 18 mm to about 25 mm, the welding amperage may decrease by about 30 A. In this case, for example, the control system 42 may increase the shielding gas flow set point from about 30 CFH to about 40 CFH to increase the size of the gas barrier 22 due to the increased ESO. It will be appreciated that the reverse is also possible, that is, the control system 42 may decrease the shielding gas flow set point if the distance between the nozzle 18 and the workpiece 25 is reduced.

As described above, the predetermined minimum shielding gas flow may be set by the control system 42. According to embodiments of the present invention, there may be at least two methods by which the minimum predetermined shielding gas flow rate is determined.

In one method, an iterative process with changes in the shielding gas flow between successive welding of a particular weld sequence is performed. While shielding gas flow may be changed, other welding settings (e.g., ESO, power, filler material composition, and weld speed among others) are held constant or are changed according to a statistical evaluation process. Workpieces may be arranged as required for production of a specific welded structure. A weld sequence for that weld structure may be performed manually or with a robot with a preselected shielding gas flow. Once the weld sequence is completed with the selected shielding gas flow, the individual welds may be inspected to determine whether each of the welds is of sufficient quality. If the welds are of sufficient quality, the shielding gas flow may be reduced in the next weld sequence to determine if there is a lower shielding gas flow that will provide the same quality. If one or more welds are not of sufficient quality, the shielding gas flow may be increased for that particular weld in the next weld sequence.

If all the welds are of sufficient quality, a second weld structure is welded according to the same weld sequence but with the lower shielding gas. The weld quality of the second weld structure may be inspected. Depending on the quality observed, the shielding gas flow may be increased if weld quality is poor or reduced further if weld quality remains sufficient. By this iterative process of reducing or increasing the shielding gas flow for a particular weld sequence and inspecting the quality of the welds, the minimum predetermined shielding gas flow for a particular weld sequence, such as, for weld sequence 100 or 120, at set welding conditions may be determined.

A similar iterative process may be used to determine the shielding gas flow on a per weld basis. For example, the minimum predetermined gas flow rate for each weld joint 106, 108, and 110 and 126, 128, and 130, within the corresponding weld sequence 100, 120 at set welding conditions, may be determined by gradually reducing the shielding gas flow between successive weld sequences and inspecting the quality of the weld joints. Depending on the weld quality, the shielding gas flow may be reduced or increased until a predetermined shielding gas flow is identified for each weld.

With reference to FIG. 1, the minimum predetermined shielding gas flow set points may be entered into the control system 42, such as, through the teach pendant 44. In this regard, the control system 42 may include a gas control program 90 that stores the minimum predetermined gas flow set point for particular weld sequences and/or for each weld within a sequence for later use during a welding process. This information may be communicated to a playback control program 92 that may coordinate setting the shielding gas flow according to the gas control program 90, movement of the robot 40, and the feeder 50 during each weld joint 106, 108, and 110 and 126, 128, and 130 of weld sequence 100, 120, respectively. The playback control program 92 may also store positional information regarding a weld path, which may be determined by teaching the robot the weld path for a particular structure with the teach pendant 44. As such, during a welding process, the gas control program 90 may set the minimum predetermined shielding gas flow for a particular weld sequence in the playback control program 92. The control system 42 may then cause the valve 60 to change the gas flow through the shielding gas controller 56 until the actual shielding gas flow from the gas delivery system 54 approximates the minimum predetermined shielding gas flow set point and is verified by the feedback circuit 68. The control system 42 may move the robot 40 to trace the welding torch 12 along the predetermined path to weld the structure with the predetermined minimum shielding gas flow set point. In this manner, the welding system 10 controls the quality of each weld joint while reducing the consumption of shielding gas because the shielding gas flow is a predetermined minimum set point for each weld sequence or for each weld in the welding process.

With reference to FIG. 1, according to another procedure for pre-determining a shielding gas flow set point for a particular weld sequence, the control system 42 may include a learning function 94. The learning function 94 may be used to determine the predetermined minimum shielding gas flow for use by the gas control program 90. To do so, the learning function 94 may provide a welding process to be executed by the control system 42 with an estimated higher-than-needed shielding gas flow. After that weld sequence, the welds may be inspected. The learning function 94 may then prompt the operator to inspect the quality of each weld joint. If the weld joints are of sufficient quality, the learning function 94 may lower the targeted shielding gas flow by a preselected amount (e.g., from about 1% to about 2%) to determine if a lower shielding gas flow will produce a weld of sufficient quality.

After welding the next structure at a lower shielding gas flow, the learning function 94 may again prompt the operator to inspect the quality of each weld joint. If the quality of the welds is not sufficient, the learning function 94 may increase the shielding gas flow set point for that weld sequence on the next welded structure. This increase may be only a predetermined portion of the previous reduction in the shielding gas flow. For example, where the learning function 94 reduces the shielding gas flow by about 2% and the weld quality is poor, the learning function 94 may increase the shielding gas flow by an amount less than 2%, such as, about 1%, for the next weld sequence. By this iterative process of lowering and raising the shielding gas flow for the same sequence on consecutive weld structures and inspecting the welds produced at those different shielding gas flows, the predetermined minimum shielding gas flow set point for that specific weld sequence or for particular welds in that sequence may be determined.

Once the shielding gas flow for the weld sequence is determined by the learning function 94, the predetermined minimum shielding gas flow set point may be saved in the gas control program 90 to be utilized by the system 10 for each welding process that includes that particular weld sequence on that particular weld structure as is described above.

Alternatively, and with reference to FIGS. 1, 4A, and 4B, rather than manual inspection of each weld joint 106, 108, and 110 and 126, 128, and 130 in the respective weld sequence 100 and 120 at a corresponding shielding gas flow, the welder 14 may include a weld quality control system 96 that may communicate with the control system 42 and, in particular, with the playback control program 92. The weld quality control system 96 may exchange information with the welder 14 regarding weld quality at different shielding gas flows during an iterative process similar to that set forth in the previous paragraphs. However, in this iterative process, the system 10 adjusts the shielding gas flow and evaluates the weld quality. The operator is no longer included in the determination of the predetermined minimum shielding gas flow set points for any of the weld joints 106, 108, and 110 and 126, 128, and 130. It will be appreciated that this process eliminates human influence on the welding process due to the subjective nature of a visual evaluation of each individual weld.

In particular, as an initial step, in one embodiment of the invention, weld quality is determined via the weld quality control system 96 at an estimated higher-than-needed shielding gas flow. Similar to the process set out above, subsequent weld sequences may be at consecutively lower shielding gas flows. For example, the weld quality control system 96 provides a predetermined reduction in the shielding gas flow from welding the weld sequence 100 on a first weld structure to welding the weld sequence 100 on a second weld structure while providing information regarding weld quality at each shielding gas flow used.

Continued reduction in the shielding gas flow from one weld sequence to the next will eventually produce a poor quality weld as determined by the weld quality control system 96. The control system 42 may then increase the shielding gas flow to a minimum level required to produce sufficient weld quality per the weld quality control system 96. This iterative process may be completed on a per weld basis and/or according to a particular weld sequence. Once the predetermined minimum gas flow set point for each weld or for each weld sequence is determined, this information may be stored within the gas control program 90. The control system 42 may utilize the set points within the gas control program 90 during subsequent welding of that weld sequence.

Specifically, weld quality may vary during production. This variation may be monitored by the weld quality control system 96. In one embodiment, weld quality may be evaluated continuously by the weld quality control system 96. Once the weld quality deviates beyond a predetermined threshold value, a new predetermined minimum shielding gas flow set point may be determined for the weld and/or for the weld sequence that exhibits poor quality. In this regard, a process similar to that described above may be used in this determination with the exception that the control system 42 may initially increase the shielding gas flow followed by evaluation of the weld quality. Once quality reaches an acceptable level, the updated shielding gas flow set points for the particular weld and/or for the particular weld sequence may be stored in the gas control program 90. By way of example, and not limitation, information associated with the weld quality, weld quality variation, and updates in the shielding gas flow set points may be stored in a first-in-first-out array stack within the gas control program 90. The exchange of information between the weld quality control system 96 and the gas control program 90 may effectively provide an ongoing dynamic determination of weld quality in response to changes in the system 10 or during normal production. In this regard, the weld quality control system 96 may be utilized to further reduce gas consumption even in the event that the weld quality is satisfactory.

According to embodiments of the invention, substantial quantities of shielding gas may be conserved. It is estimated that by adjusting the shielding gas flow during welding on a per weld basis will reduce shielding gas consumption by up to about 50%. In addition, it is estimated that by reducing or eliminating gas surges, consumption of shielding gas will be reduced by up to about 50%.

In another embodiment of the invention, a sensor 98 is operatively coupled to the welder 14 and monitors its power output (at least one of amperage and voltage) during welding. The sensor 98 may be utilized to determine the minimum predetermined shield gas flow set points. In one embodiment, the system 10 may lack the weld quality control system 96. Instead, the sensor 98 may be utilized to provide voltage and/or amperage as an indication of power consumption or other waveform information that can be correlated to weld quality. In particular, information from the sensor 98 may be utilized by the learning function 94 to correlate the weld quality with the shielding gas flow.

To that end, a baseline for the sensor 98 may be established by monitoring the power output from the welder 14 through the sensor 98 during welding of a particular weld joint. That power output may be correlated with a visual inspection of weld quality and with the shielding gas flow utilized during welding of the joint. By an iterative process similar to that set out in the preceding paragraphs, the predetermined minimum shielding gas flow may be associated with weld quality via the sensor 98.

In particular, after welding an initial weld sequence at a high shielding gas flow, shielding gas flow may be reduced in subsequent welding processes while the sensor 98 monitors the power output of the welder 14. The weld quality during each welding process may be inspected and then correlated with the power data from the sensor 98. In this manner, the learning function 94 may correlate the shielding gas flow and the power output as detected by the sensor 98, among other process variables, to the weld quality. By an iterative process similar to that set out in the preceding paragraphs a minimum predetermined shielding gas flow is determined. Once that minimum flow is determined for each weld sequence and/or on a per weld basis, the control system 42 may monitor the sensor 98 and evaluate the power for each weld according to the data available in the learning function 94.

During subsequent welding, the data from the sensor 98 may be compared to high and low limits on the power output as was previously determined by the iterative process and stored according to the learning function 94 in the control system 42. Thus the data from the sensor 98 may be an indicator of poor weld quality or a trend in weld quality, both good and bad. If the power output falls outside of limits established by learning function 94, the control system 42 may alert an operator that there may be a problem with the welding process. This problem may include a problem with the shielding gas flow or another problem. Advantageously, continuously monitoring the power output of the welder 14 via the sensor 98 reduces or eliminates the likelihood of producing poor quality welds.

On the other hand, if the detected power output via the sensor 98 falls outside of the acceptable high-low range, the learning function 94 may change the shielding gas flow setting in order to establish a new predetermined minimum flow for subsequent welds. Similar to the process set forth above, embodiments of the present invention may provide an adaptive or an ongoing dynamic determination of weld quality associated with shielding gas flow.

While the present invention has been illustrated by a description of various embodiments and while these embodiments have been described in some detail, it is not the intention of the inventors to restrict or in any way limit the scope of the appended claims to such detail. Additional advantages and modifications will readily appear to those skilled in the art. The various features of the invention may be used alone or in any combination depending on the needs and preferences of the user.

What is claimed is:

1. A gas delivery system for delivering a shielding gas from a source of the shielding gas through one or more pipes or hoses to a welding torch having a nozzle during welding of one or more workpieces, the gas delivery system comprising:
    a shielding gas controller including:
        an inlet for receiving shielding gas from the source of shielding gas through the one or more pipes or hoses,
        an outlet from which shielding gas flows to the nozzle, and
        at least one valve between the inlet and the outlet and being operable in response to a predetermined minimum shielding gas flow set point,
    wherein the shielding gas controller operates the at least one valve at least once before or after a first weld of a first weld sequence to change the flow of the shielding gas from the nozzle according to the predetermined minimum shielding gas flow set point; and
    a control system in operable communication with the shielding gas controller and including a control program that stores predetermined minimum gas flow set points associated with a plurality of weld sequences and/or associated with each weld within a weld sequence including the predetermined minimum gas flow set point for a first weld of the first weld sequence and capable of communicating the predetermined minimum shielding gas flow set point during the first welding sequence including for the first weld to the shielding gas controller.

2. The gas delivery system of claim 1, wherein the valve includes a variable orifice for changing a flow of the shielding gas during welding.

3. The gas delivery system of claim 2, wherein the shielding gas controller changes the size of the orifice so as to increase or decrease the shielding gas flow rate during an arc start sequence, as compared to the predetermined minimum shielding gas flow set point.

4. The gas delivery system of claim 1, wherein the at least one valve is a proportional valve.

5. The gas delivery system of claim 1, wherein each of the at least one valve is associated with a flow restrictor.

6. The gas delivery system of claim 1, wherein the shielding gas controller further includes a sensor that is capable of measuring the actual gas flow rate from the outlet and transmitting a signal indicative of the measured flow rate.

7. The gas delivery system of claim 6, wherein the sensor detects changes in the flow of shielding gas during welding caused by an obstruction in the one or more pipes or hoses upstream and downstream of the sensor and the shielding gas controller operates the valve to maintain the shielding gas flow at the predetermined minimum shielding gas flow set point.

8. The gas delivery system of claim 1, wherein:
a welding process sequence includes a first weld sequence and a second weld sequence different from the first weld sequence in at least one of welding direction, workpiece geometry, or welding speed, and
the control program stores a first predetermined minimum gas flow set point for the first weld sequence and a second predetermined minimum gas flow set point for the second weld sequence and the shielding gas controller changes the shielding gas flow rate from the first predetermined minimum gas flow set point to the second predetermined minimum gas flow set point between the first weld sequence and the second weld sequence.

9. The gas delivery system of claim 1, wherein the shielding gas controller changes the shielding gas flow rate during an arc end sequence, as compared to the predetermined minimum shielding gas flow set point.

10. The gas delivery system of claim 1, further including a sensor in fluid communication with the shielding gas in the one or more pipes or hoses that detects nitrogen and/or other contaminants in the shielding gas.

11. The gas delivery system of claim 1, further including an air supply system in fluid communication with the nozzle for supplying compressed air to the nozzle.

12. A welding system for welding two workpieces comprising:
the gas delivery system of claim 1;
a welding torch having the nozzle;
a welder electrically coupled with the welding torch;
a robot that provides relative movement between the welding torch and the two workpieces so as to trace the welding torch along a predetermined weld path between the two workpieces; and
a feeder for metering a filler material to the two workpieces,
wherein the control system is in operable communication with the welder and the robot.

13. The system of claim 12, further including:
a weld quality control system in operable communication with the control system and the welder, the weld quality control system detecting the quality of the first weld and the quality of one or more subsequent welds and sending a signal to the control system indicative of the respective weld quality, and
wherein the control system calculates a second predetermined minimum shielding gas flow set point, different from the predetermined minimum shielding gas flow set point and based on the respective weld quality, stores the second predetermined minimum shielding gas flow set point, and communicates the second predetermined minimum shielding gas flow set point to the shielding gas controller during welding of the respective weld on a subsequent workpiece.

14. The system of claim 12, further including:
a sensor in operable communication with the control system and the welder, the sensor detecting one or more of voltage and amperage from the welder during welding and sending a signal to the control system indicative of the one or more of the voltage and amperage from the welder, and
wherein the control system calculates a second predetermined minimum shielding gas flow set point, different from the predetermined minimum shielding gas flow set point and based on the signal indicative of the one or more of the voltage and amperage, and communicates the second predetermined minimum shielding gas flow set point to the shielding gas controller during welding of the respective weld on a subsequent workpiece.

15. The system of claim 12, wherein the shielding gas controller increases or decreases the shielding gas flow rate during an arc start sequence, as compared to the predetermined minimum shielding gas flow set point.

16. The system of claim 12, wherein the welding process sequence includes a first weld sequence and a second weld sequence different from the first weld sequence in at least one of welding direction, workpiece geometry, or welding speed, and the control program stores a first predetermined minimum gas flow set point for the first weld sequence and a second predetermined minimum gas flow set point for the second weld sequence and the shielding gas controller changes the shielding gas flow from the first predetermined minimum gas flow set point to the second predetermined minimum gas flow set point between the first weld sequence and the second weld sequence.

17. The system of claim 12, further including a sensor in fluid communication with the shielding gas in the one or more pipes or hoses that detects nitrogen in the shielding gas.

18. The system of claim 12, further including an air supply system in fluid communication with the nozzle for supplying compressed air to the nozzle.

19. The system of claim 12, wherein, during welding, the shielding gas controller outputs a signal to the control system related to the shielding gas flow rate from the outlet.

20. The system of claim 12, wherein the welder includes a weld quality control system in communication with the control system, the weld quality control system being configured to evaluate the quality of the first weld.

* * * * *